United States Patent
Goldstein et al.

(10) Patent No.: US 8,423,982 B2
(45) Date of Patent: *Apr. 16, 2013

(54) SPECULATIVE COMPILATION

(75) Inventors: Theodore C. Goldstein, Los Altos, CA (US); Stephen Naroff, San Jose, CA (US); Matthew Austern, Alameda, CA (US); Fariborz Jahanian, Los Gatos, CA (US); Stan Jirman, Santa Clara, CA (US); P. Anders I. Bertelrud, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/012,652

(22) Filed: Jan. 24, 2011

(65) Prior Publication Data

US 2011/0119658 A1    May 19, 2011

Related U.S. Application Data

(63) Continuation of application No. 10/807,833, filed on Mar. 24, 2004, now Pat. No. 7,877, 738.

(60) Provisional application No. 60/480,301, filed on Jun. 20, 2003.

(51) Int. Cl.
    *G06F 9/44*    (2006.01)
(52) U.S. Cl.
    USPC .......................................................... 717/140
(58) Field of Classification Search ........................ None
    See application file for complete search history.

(56) References Cited

PUBLICATIONS

From Source to Binary: The Inner Workings of GCC http://www.redhat.com/magazine/002dec04/features/gcc/—Diego Novillo—Red Hat Magazine, Issue 2, Dec. 2004.
High-Level Loop Optimizations for GCC http://gcc-ca.internet.bs/summit/2004/High%20Level%20Loop%20Optimizations.pdf—Daniel Berlin et al.—GCC Developers' Summit, Jun. 2-4, 2004, Ottawa, Canada.
OpenMP and automatic parallelization in GCC http://people.redhat.com/dnovillo/Papers/gcc2006.pdf—Diego Novillo—GCC Developers' Summit, Jun. 28-30, 2006, Ottawa, Canada.
GCC Compile Server—http://gcc-ca.internet.bs/summit/2003/GCC%20Compile%20Server.pdf Per Bothner—GCC Developers' Summit, May 25-27, 2003, Ottawa, Canada.

*Primary Examiner* — Philip Wang
(74) *Attorney, Agent, or Firm* — Novak Druce Connolly Bove + Quigg LLP

(57) ABSTRACT

The invention is a method and apparatus for use in developing a program. More particularly, a method and apparatus for compiling a source code program during editing of the same is disclosed, where editing can be initial entry or modification subsequent to initial entry. The method comprises compiling at least a portion of a source code program defined by a waypoint during the editing of the source code program. In other aspects, the invention includes a program storage medium encoded with instructions that, when executed, perform this method and a computer programmed to perform this method. The apparatus includes a computing apparatus, comprising a text editor through which a source code program may be entered; and a compiler that may compile the source code program. The control block is capable of determining at least one waypoint in the source code program and invoking the compiler to compile the source code program up to the waypoint.

15 Claims, 5 Drawing Sheets

SPECULATIVE COMPILATION

CROSS-REFERENCE TO RELATED APPLICATIONS

This application is a continuation of application Ser. No. 10/807,833, filed Mar. 24, 2004 now U.S. Pat. No. 7,877,738.

This application claims the earlier effective filing date of U.S. Provisional Application Ser. No. 60/480,301, filed Jun. 20, 2003, entitled "SPECULATIVE COMPILATION", in the name of the inventors Theodore C. Goldstein, et al., and commonly assigned herewith.

BACKGROUND OF THE INVENTION

1. Field of the Invention

The present invention pertains to program compilation and, more particularly, to speculative compilation of a program.

2. Description of the Related Art

There typically is a sharp distinction between the code with which people program a computer and the code that the computer actually executes. Computers perform their programmed tasks by executing what is known as "object code." Object code is a series of 1's and 0's that the computer's processor reads and interprets to perform its programmed tasks. However, actually programming in object code is exceedingly difficult, tedious, and time-consuming for a programmer. Programmers therefore rarely program in "object code." Once a program has been designed, a programmer will usually code the program in "source code." Source code is a high level language such as C, C++, Objective C, FORTRAN, ADA, PASCAL, etc. that is easier for people to read.

"Compilation," in the context of computer programming, is the process by which a computer translates source code to object code. Compilation is performed by a software tool called a "compiler" executed by the computer for this purpose. Compiler design and compilation involve many considerations and are sufficiently complex that whole books have been written on the topic. See, e.g., Alfred V. Aho, et al., *Compilers—Principles, Techniques and Tools* (Addison-Wesley Pub. Co. 1986) (ISBN 0-201-10088-6). However, some generalizations may be drawn.

In the classic scenario, the programmer codes the program in source code using a "text editor," another software tool. When the programmer finishes coding the program, the programmer saves the program and invokes a compiler. More particularly, a programmer writes and edits one or more source code program files and then initiates a "build" to compile these source code files. The build process may be initiated by the programmer in various ways, including through a user interface gesture (e.g., clicking on a "build" button) or by invoking a command, such as make or jam, from a command line.

Once the compiler compiles the source code into object code, the compiled object code can then be executed by the computer. In the program's development phase, the source code may be debugged by editing the program in the text editor and then compiling (or, recompiling) the edited source code. This process may be iterated many times, depending on the complexity of the program. Each time, the compiler is invoked on the whole program. However, under the conventional approach, no compilation occurs until the user expressly initiates a build. As such, much of the "idle time" during which the user is proof-reading or editing source code goes unused.

Consider the example shown in FIG. 1. FIG. 1 illustrates a source code program 100 comprised of multiple files. The source code program 100 is written in C, and is presented in pseudo-code. The source code program 100 comprises a source file 102 name "a.c" and several header files 104, 106, 108 named "a.h," "b.h," and "c.h," respectively. The header files 104-108 are defined as part of the source code program 100 by the "#include" statements 110, 112, 114, in accordance with the programming principles for C. The header files 104-108 may contain declarations or definitions of data types and variable declarations and some inline code declarations used by the source file 102.

In accord with conventional practice, the programmer fully enters all the source code 100 through the end 116 thereof. The programmer then invokes a compiler, not shown in FIG. 1. The compiler includes a "file reader" that starts reading the source file 102, diverting to the header files 104-108 as it comes across the respective "#include" statements 110-114. The compiler reads through each header file 104-108 to its end, and returns to the source file 102 after finishing the respective header files 104-108. The compiler continues reading the source file 102, diverting to header files 104-108 when it encounters the "#include" statements 110-114, respectively, until it reaches the end of 116 of the source file 102. This reading of the source file 102 is but one part of the compilation process.

On average, the majority of time spent in any given compilation of a C-type program is spent in reading the header files of the source code program. It is not unusual for a compiler to process orders of magnitude more data in header files than it does in source files. However, the code in the header files rarely, if ever, changes during the editing sessions of the source files. Thus, as a general rule, the header files take less time to develop than do the source files, but take much longer to process for compilation.

Some attempts have been made to combine the steps of coding the source code and compiling it into object code. Typically, these attempts are in the form of "interpreted languages." Apple's APPLESCRIPT and Microsoft's VISUAL BASIC are two tools that attempt to compile the source code as the programmer codes the program. Both of these tools combine the function of the text editor and the compiler. In theory, this accelerates the development process since the compilation does not have to wait for all the source code to be entered.

Users of these kinds of tools report great satisfaction because the development process is relatively rapid. However, these tools suffer from disadvantages. One disadvantage is loss of efficiency. One important aspect of most compiler designs is code "optimization." See Aho et al., supra, at pp. 585-718. Code optimization typically involves modifying some portions of an intermediate representation of the source code so that the resulting object code runs more efficiently. Most optimizations require analysis of, and modifications to, instructions that may be separated by any number of lines of source code. By handling each line of code one line at a time, these types of tools lose the efficiencies that might otherwise be obtained through optimization. These tools therefore are used for smaller kinds of programs and those in which speed is not of prime importance, and generally are not used to create, for example, large desktop applications.

Some attempts have therefore been made to develop text editor-compiler tools dedicated to C-type languages commonly used to create desktop applications. C-type languages include, e.g., C, C++, and Objective C. Exemplary of this type of tool is SABER-C. These types of tools generally performed well in implementing a rapid development phase compiler and a slower production phase compiler. However, these tools failed to implement the identical production compiler semantics of their competitors and lost popularity.

An alternative approach employs "pre-compiled" header files with C-type languages. In this approach, some header files that may be frequently used are pre-compiled and stored. Then, when it comes time to compile the program, the header files are already compiled, thereby reducing compile time for the program as a whole. Pre-compiled header files, however, take a relatively large amount of storage. This mitigates against their frequent use, particularly with arbitrary sets of files with non-uniform initial sequences of preprocessing directives.

The present invention is directed to resolving, or at least reducing, one or all of the problems mentioned above.

SUMMARY OF THE INVENTION

The invention is a method and apparatus for use in developing a program. More particularly, a method and apparatus for compiling a source code program during editing of the same is disclosed, where editing can be initial entry or modification subsequent to initial entry. The method comprises compiling at least a portion of a source code program defined by a waypoint during the editing of the source code program. In other aspects, the invention includes a program storage medium encoded with instructions that, when executed, perform this method and a computer programmed to perform this method. The apparatus includes a computing apparatus, comprising a text editor through which a source code program may be entered; and a compiler that may compile the source code program. The control block is capable of determining at least one waypoint in the source code program and invoking the compiler to compile the source code program up to the waypoint.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
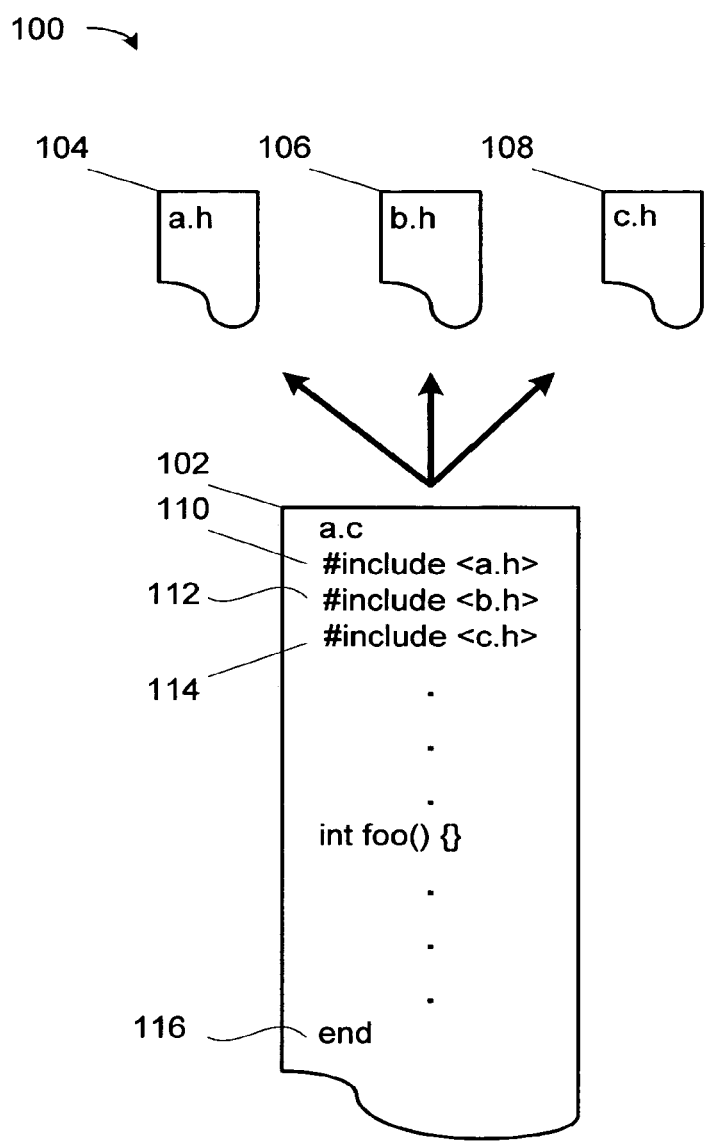
FIG. 1 illustrates a conventional program development process in which a source code program is compiled after entry through a text editor.
Figure 2:
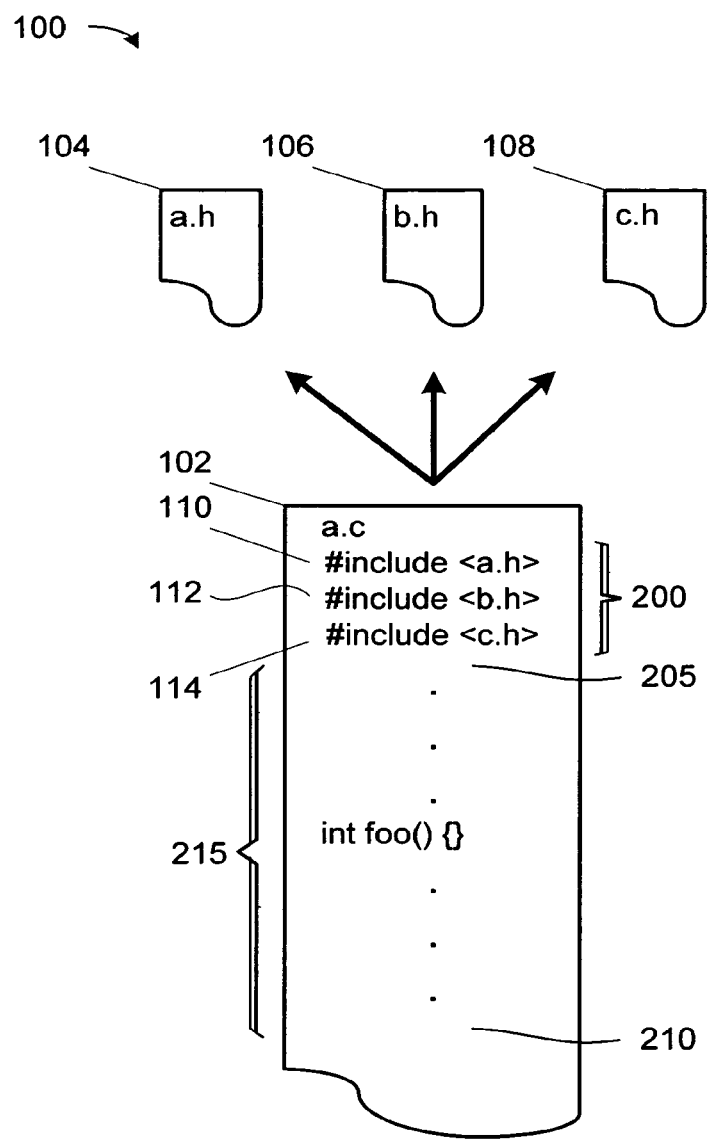
FIG. 2 illustrates a program development process in accordance with the present invention in which the source code program of FIG. 1 is speculatively compiled before it is completely entered.

The invention includes a method and apparatus for use in code development. More particularly, the invention is a method for speculatively compiling a source code program on an appropriately programmed computing apparatus. For convenience, the method will be illustrated on a portion of the same source code program 100 first shown in FIG. 1, and reproduced in FIG. 2. However, the source code program 100 in FIG. 2 is still being edited by a user, since the end 106 of the source file 102, shown in FIG. 1, is missing in FIG. 2. As was previously mentioned, the source code program 100 is coded in C. However, the present invention is not limited to C programming language environments, or even C-type (e.g., C++, Objective C) language environments. The present invention may be applied to virtually any type of high level, source code programming language also including, but not limited to, FORTRAN, ADA, PASCAL, JAVA, assembly language, etc.

Figure 3:
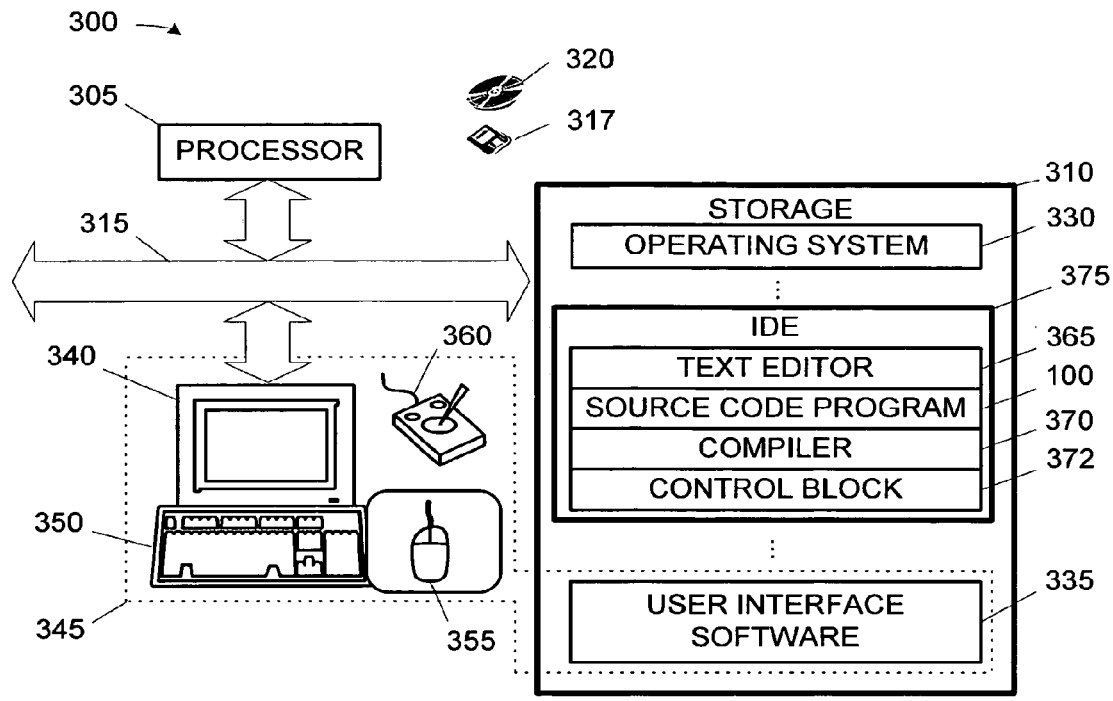
FIG. 3 depicts, in a block diagram, a computing apparatus such as may be used to implement the process of FIG. 2 in one particular embodiment.

The invention may be implemented in software on a computing apparatus, such as the computing apparatus 300 illustrated in FIG. 3. The computing apparatus 300 may be implemented in any convenient fashion known to the art, including, but not limited to, a desktop personal computer, a workstation, a notebook or laptop computer, or an embedded processor. The computing apparatus 300 illustrated in FIG. 3 includes a processor 305 communicating with storage 310 over a bus system 315 and operating under the direction of an operating system 330. The operating system 330 may be any operating system known to the art, such as MacOS®, Windows®, Disk Operating System®, Unix®, Linux®, etc. In the illustrated embodiment, the operating system 330 is a Unix® operating system.

The storage 310 may comprise a hard disk and/or Random Access Memory ("RAM") and/or removable storage such as a magnetic disk 317 or an optical disk 320. The user interface software 335, in conjunction with a user interface 345 allows a user to input information that can be displayed on a display 340. The user interface 345 may include peripheral I/O devices such as a key pad or keyboard 350, a mouse 355, or a joystick 360. The processor 305 runs under the control of the operating system 330, which may be practically any operating system known to the art.

The source code program 100, a conventional text editor 365 that provides conventional editing functions, and a compiler 370 may be stored in the storage 370. The text editor 365, compiler 370, and a control block 372 comprise, in the illustrated embodiment, a portion of an Integrated Development Environment ("IDE") tool 375. Other commonly known and understood components of the IDE 375, such as linkers, debuggers, etc., are not shown for the sake of clarity and so as not to obscure the invention. Alternative embodiments of the IDE 375 may have more, fewer, or different components from those of the embodiment illustrated in FIG. 3. Common examples of IDE systems include CodeWarrior™ offered by Metrowerks™ and, Project Builder by Apple®, Visual Studio® offered by Microsoft®.

The invention is not limited to embodiments implementing an IDE. For illustrative purposes, the present invention is described in the context of an IDE, although it should be appreciated that one or more embodiments of the present invention may be applicable to other integrated environments that may be employed to design and develop software applications. Note also that the control block 372 may be implemented in various alternative embodiments as a standalone component, integrated into the IDE tool 375, or may be integrated into some other software component (not shown) capable of interfacing with the IDE tool 375. Although the instant invention is not so limited, in the illustrated embodiment, the control block 372 is implemented as a background thread that is capable of performing one or more tasks for the IDE tool 375, as described in greater detail below.

The control block 372 may comprise a portion of the text editor 365 or the compiler 370, or may be separate therefrom. The text editor 365 and compiler 370 may be any suitable text editor and compiler, respectively, known to the art in the illustrated embodiment. The design and implementation of text editors and compilers is well known in the art, and so further discussion will be omitted so as not to obscure the invention.

Figure 4:
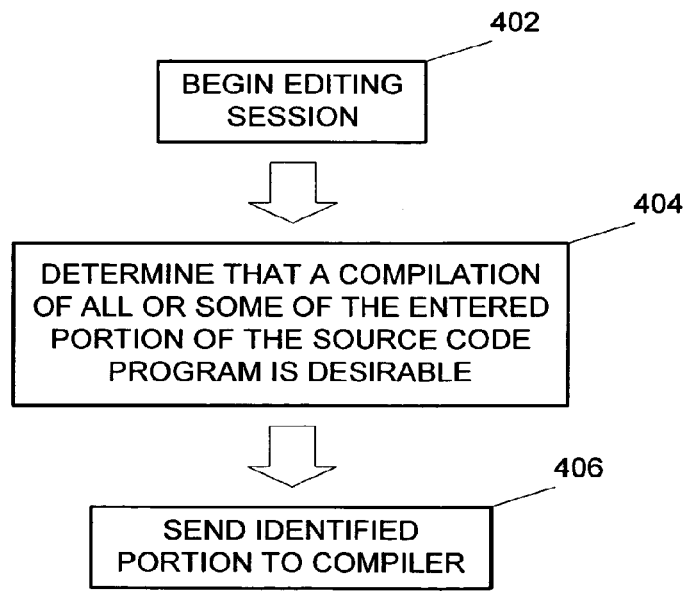
FIG. 4 is a flowchart of one particular embodiment of the present invention.

FIG. 4 charts the flow of the operation of the embodiment illustrated in FIG. 2-FIG. 3. Referring now to FIG. 2-FIG. 4, in accordance with the present invention, a programmer (not shown) opens the text editor 365 through the user interface 345 and begins editing (at 402) the source code program 100. The editing may comprise the initial entry of the source code program 100, or a session in which source code program 100 is being altered subsequent to the initial entry. The programmer may or may not actually save what has been entered of the source code program 100. However, the processor 305 has access to one or more files containing that portion of the source code program 100 that has been entered by the programmer stored in the storage 310. As the source code program 100 is entered, the IDE 375 determines (at 404) that a compilation of all or some of the entered portion of the source code program 100, e.g., the portion 200, is desirable. In the illustrated embodiment, the IDE 375 then sends (at 406) the desired portion 200 to the compiler 370 for compilation. The IDE 375 does not wait for the programmer to finish entering the source code program 100, but rather performs its function at some point during the entry. Thus, the portion of the source code program 100 sent (at 406) to the compiler is "speculatively" compiled.

More particularly, the IDE 375 selects (at 404) a "waypoint," e.g., a point 205 shown in FIG. 2, in the source code program 100. A "waypoint" is a point in the source code program 100 defining a bound of a portion of the source code program 100 for which it is desirable to begin compiling prior to the end of an editing session. In the illustrated s embodiment, a waypoint at the point 205 defines a lower bound for the portion 200, the first "#include" statement 110 defining the upper bound. The determination and selection of the waypoint 205 will be implementation specific, and will be discussed further below. The upper and lower bounds should be distant enough to realize benefits from the application of one or more of the optimization techniques employed by the compiler 370. However, the waypoint 205 should not be so distant as to exceed the point of diminishing returns from the application of the invention. For instance, if the waypoint 205 is selected to define a portion 200 that essentially constitutes the entire source code program 100 once it is fully entered, then, in some instances, some of the benefits of the present invention will be lost.

One approach to identifying the waypoint 205 is to statically define the criteria for a waypoint. An embodiment may define a waypoint at some appropriate, top level form language element such as a definition or declaration. For instance, when programming with a C-type language, it may be convenient to statically define a waypoint at the point 205 where the "#include" statements 110-114 defining the applicable header files 104-108 for the source file 102 conclude. As was previously noted, in C-type languages, compilers spend many times the amount of effort in analyzing header files that they do in analyzing the remaining portion of the source files. Thus, the waypoint 205 at the point after which all the "#include" statements 110-114 have been put forth will greatly reduce the total development time for the source code program 100, as a whole. Alternatively, the waypoint 205 may be defined as a particular line number in the file, or after some predetermined number of loops, etc.

However, the waypoint need not be defined statically. For instance, a waypoint may be defined at the point 210 of the programmer's text editor 365 after some predetermined time. Alternatively, the waypoint may be defined at any point up to the point 210 of the programmer's text editor insertion point, or even to some point after the text editor insertion point. For instance, the waypoint may be after some predetermined number of branch statements, or conditionals regardless of the text editor insertion point. The waypoint may also be defined to be some text position offset in the file. In still another alternative, the programmer may manually select the waypoint, for example, while editing.

Note also that multiple waypoints may be used in some embodiments. For instance, it may be desirable to compile in accordance with the present invention a middle portion 215 of the source code program 100. In this alternative, a first waypoint 205 defines an upper bound for the portion to be compiled and a second waypoint 210 defines the lower bound in the manner described above. Note that, in the embodiment illustrated in FIG. 2 above, the first statement 110 in the source file 102 can be considered a waypoint defining the upper bound of the portion 200. However, in such an embodiment, there may be at least one waypoint intermediate the first and last lines of the source file. Multiple waypoints may also be employed in embodiments where multiple portions, e.g., the portion 200 and the middle portion 215, are both compiled in the same editing session.

In the context of C-type programming languages, a waypoint at the point 205 at which the "#include" statements 110-114 may be sufficient to reap one or more of the benefits of the present invention. Nevertheless, other programming languages might exhibit compiler processing characteristics mitigating for a static definition at some other point in the source code program or even a dynamic definition.

Returning to the illustrated embodiment, the IDE tool 375, shown in FIG. 3, causes the compiler 370 to start and read the source code program 100. The IDE tool 375 causes the compiler 370 to start and read from the standard input defined, in the illustrated embodiment, by UNIX. For instance, in C syntax:

=popen("gcc-stdin");

The IDE 305 then sends the portion 200, i.e., up to the waypoint 205, to the compiler 370. The compiler 370 compiles the portion 200, and waits until further portions are supplied.

As the compiler 370 compiles the portion 200, the programmer continues coding the source code program 100. Once the programmer is finished coding the source code program 100, the programmer saves it. Note that, in some embodiments, the source code program 100 may not be saved or may be saved at some point after compilation.

Existing IDEs may be modified to practice the present invention. As will be appreciated by those skilled in the art having the benefit of this disclosure, engineers frequently modify existing systems, such as IDEs, to support additional functionality. IDEs generally use an external compiler that operates in batch mode. Typically, this batch mode processing is slower than what is found in dynamic environments. There are many IDEs commercially available that use an external compiler. These include but are not limited to Microsoft's Visual Studio and Apple's Project Builder environments. The present invention can provide the speed of a dynamic environment without compromising the design integrity and advantages of maintaining a separate code base for the compiler and the IDE. The present invention can also enhance the functionality of such an environment by modification of the structure of the IDE tool itself without substantially adversely affecting the existing functionality that the IDE supports.

Figure 5:
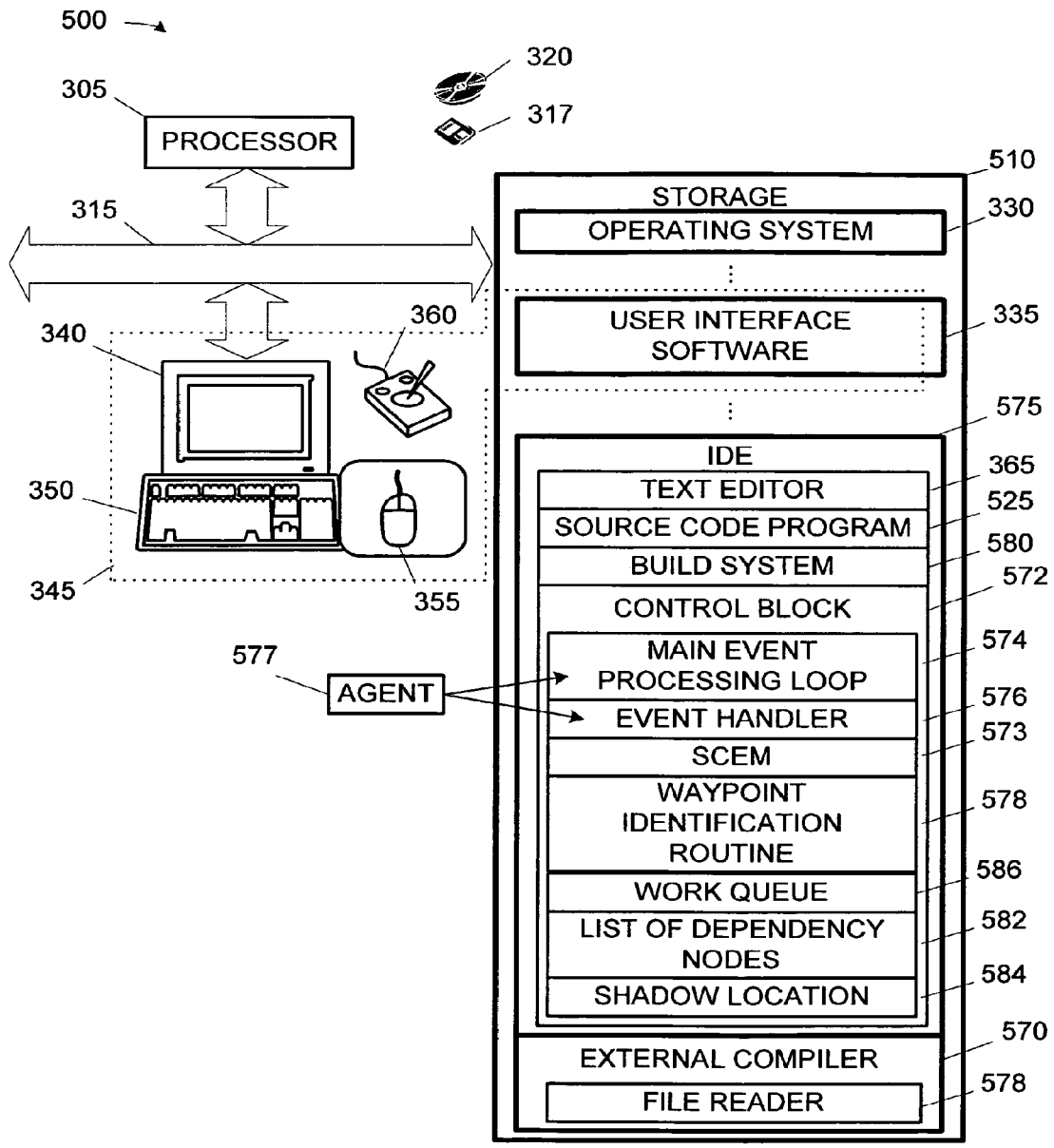
FIG. 5 depicts, in a block diagram, one particular implementation of the computing apparatus in FIG. 3.

FIG. 5 illustrates a computing apparatus 500 in which an existing IDE tool 575 includes a build system 580 that invokes the external compiler 570 and is modified to support this interaction. In this particular embodiment, the invention is employed during debugging, as opposed to initial entry. However, as discussed above, the invention is not so limited and may be employed during initial entry. The IDE tool 575 includes a text editor 365. The text editor 365 edits a region of text in the source code program 100 whose bytes may be numbered from 1 to N, where N is the size of the file. The waypoint 205, shown in FIG. 2, is a point in the text W of the source code program 100 such that 1<W<N, (i.e., the waypoint 205 is somewhere between the beginning and the end of the file) as is apparent from the above discussion of the waypoint 205 relative to FIG. 2.

The control block 572 includes a code routine which, for present purposes, is called the speculative compiler event monitor ("SCEM") 573. The existing IDE tool 575 can be modified to speculatively compile the source code program 100 by first identifying the main event processing loop 574 of the IDE tool 575 or the event handler architecture 576. An agent 577 known to the SCEM 573 is then inserted into either the main event processing loop 574 or the event handler architecture 576. A waypoint identification routine 578, whose functionality is described above relative to FIG. 2, is then inserted into the IDE tool 575. The compiler can then be modified by identifying the file reader portion 578 of the code 568 and modifying it as described above to read from standard input using the open system call or other similar read routine. The build system 580 of the IDE tool 575 can then by modified by identifying the build dependencies and maintenance aspects of the system and exposing them through an interface to the SCEM 573.

The aspects of modifying the build system in one particular embodiment are more fully disclosed in U.S. patent application Ser. No. 10/660,353, filed Sep. 11, 2003, in the name of P. Anders I. Bertelrud, et al., entitled "Predictively Processing Tasks for Building Software", and commonly assigned herewith. In general, the IDE tool 575 allows a user to design and develop software applications or products. The initial step of developing the software product(s) generally involves creating a project. A project contains one or more elements that are used to "build" the software product(s). In a programming context, and as used herein, the term "build" refers to putting individual coded components (e.g., source file 102 and header files 104, 106, 108, in FIG. 2) of a program (e.g., the source code program 100, FIG. 2) together.

The project created using the IDE tool 575 typically maintains the relationships between various elements contained therein. A project may contain a variety of elements, such as file references, targets and build styles, products, and the like. File references, for example, may include source code files, resource files, libraries, and frameworks. Targets generally describe how to build a particular product, such as a framework, command-line tool, or application, and a build style describes how to create a variation of the target's product. In the illustrated example, the source code program 100 constitutes a "project", comprising the source and header files 102-108, that is a "product" under development. As utilized herein, the term "product" refers to the finished model, and may, for example, include one or more of the linked executable files, associated resource files, etc.

A project may have one or more associated targets. For example, a project for a client-server software package may contain targets that create a client application, a server application, command-line tools that can replace the applications, and a private framework that all the other targets use. By putting these related targets into a single project, it is possible to share files and express dependencies among them. For example, if a project is set up so that the applications and command-line tools depend on the private framework, the IDE tool 575 can determine that it should first build the framework before it builds the applications or tools.

For a given project, the IDE tool 575 maintains a list 582 of dependency nodes for each file that participates in the build, where the files may include source files, intermediate files, and product files. Examples of "source files" may include source code files (e.g., the source code file 102), resource files, library files, header files (e.g., the header files 102, 104, 106 in FIG. 2), and frameworks. Examples of "product files" may include files that appear in the deployable product such as executable files. Examples of "intermediate files" may include files that are neither specified by the user nor end up in the product, such as generated object code files, precompiled headers, and temporary files used by custom shell scripts. In the illustrated embodiment, the source file 102 is dependent on the header files 104-108. The dependency node list for this project would therefore list the source and header files 102-108.

In the illustrated embodiment, the IDE tool 575 creates the list 582 of dependency nodes based on information from the product type and the target before the build process starts. Each dependency node typically includes a set of references to other nodes on which it depends and a set of actions that may be performed to bring the node up-to-date. In one embodiment, the IDE tool 575 utilizes a directed acyclic graph ("DAG", not shown) as is known in the art to define the dependency relationships between the various nodes in the project. The use of DAGs is well known in the art, and thus is not described in detail herein so as to avoid unnecessarily obscuring the instant invention.

Once the desired file reference components (e.g., source file 102 and header files 104, 106, 108, in FIG. 2) have been created for a given project, the user can build the product under development. This may be accomplished, for example, by invoking the make or jam tools via the command line or through a user interface gesture, such as selecting a build button (not shown) that may be part of a graphical user interface 345. The IDE tool 575 comprises a variety of tools to build the product, such as a linker (not shown). The compiler 470 compiles one or more of the source files to create object code files. The linker links the object files produced by the compiler 470 against the frameworks and libraries listed to create a binary file. As part of the build process, various tools of the IDE tool 575 can also process resource files, which define the windows, menus, icons, and the like that are associated with the product under development.

Once the build of the development product is complete, the IDE tool 575 provides an executable file that may be executed and tested by the user. The user may use a debugger (not shown) of the IDE tool 575 to, for example, view the various variable values of the executing file, examine the call chain, evaluate expressions, and the like. If any errors are discovered, the user may edit the source code files (or other types of files) to correct the error and then initiate the build process again. This process may be iterated as many times as desired to produce a final software product.

During the development stage of the product, it is not unusual for the user to engage in several iterations of debug and recompile sessions before arriving at the final product. As the user creates new source code (or resource) files or modifies existing source code (or resource) files associated with a project, these files become out-of-date and thus require compiling or recompiling. The compilation or recompilation of each out-of-date file is considered a task, and each task is placed in a work queue 586. The control block 472 tasks in the work queue 586 in a variety of ways, depending on the particular implementation. For example, the control block 472 may periodically check the work queue 586 to see if any tasks need processing. Or, the control block 472 may be invoked or awakened each time a new task is posted in the work queue 586 by the IDE tool 575. The IDE tool 575 may alternatively identify a task in response to, for example, determining that the user has saved (or resaved) a revised version of a source file (e.g., source code file, resource file, etc.), or in response to other conditions.

Processing tasks from the work queue 586 may comprise performing, for example, one or more of the following tasks: creating directories, moving files, invoking the compiler 570 and the linker, and the like. The work queue 586 contains, in dependency-sorted order (based on the information from the DAG), a set of tasks for files that are out-of-date. Thus, for example, if a user modifies a header file that is referenced in a source file, both the header file and the source file may be identified in the work queue 586 because of the underlying dependency.

In accordance with the present invention, the IDE tool 575 identifies a file as being out-of-date in response to determining (at 404, FIG. 4) that it is desirable to compile a portion of a source code program 100 currently being edited or entered. Note that this may occur not only during debugging but during initial entry. This response may be triggered, for example, by the identification of a waypoint (e.g., the waypoint 205, FIG. 2), as described above, by the waypoint identification routine 578. Where multiple waypoints 205, 210 are identified, this response is triggered by each identification. At this point, the IDE tool 575 "sends" the portion 200 to the compiler 570 for compilation.

More technically, this "sending" can be accomplished in one of several ways. In one implementation, the SCEM 573 places a task on the work queue 586, for the compiler 570 to compile the portion 200 of the source file 100 defined by the waypoint 205. In a second implementation, the SCEM 573 creates a separate file (not shown) that includes only that portion 200 of the source file 100 defined by the waypoint 205 and then places that file on the work queue 586. Still other embodiments may employ various other implementations to initiate the compilation of the portion 200 of the source file 100.

Referring now to both FIG. 2 and FIG. 5, the SCEM 573 awaits processing of the incoming user keystrokes and chooses an appropriate time to begin processing of the compilation of the pre-waypoint code, e.g., the portion 200 of the source code program 100 in is FIG. 2. Those skilled in the art having the benefit of this disclosure will be able to choose a time that does not distract from the programming experience. On slower machines this may be a rare interval where a programmer has paused programming for some predetermined number of minutes. On a fast computer, this may be every second. Thus, the appropriate time will be implementation specific depending on the implementation of the computing apparatus.

The SCEM 573 conducts its processing in at least two phases: first, it processes the pre-waypoint processing from byte one to byte W, i.e., up to the waypoint 295. The SCEM 573 then processes the post-waypoint code from byte W to byte N, i.e., from the waypoint 205 to the next waypoint 210 or the end of the program source code 102. If multiple waypoints 205, 210 are present, the process repeats until the SCEM 573 processes to the end of the program source code 102. The SCEM 573 begins the main event processing loop 574 when the programmer first starts editing a file, e.g., the source code program 100, and begins the first phase, pre-waypoint processing as soon as the programmer edits a new file. The SCEM 573 performs the second phase, post-waypoint processing either speculatively, when it has some idle cycles, or when the user saves the file. The SCEM 573 observes the compilation, and then updates the build system 580 to know the precise state of the truth of the file.

For each phase of the processing, the control block 472 of the IDE 575 processes the tasks in the work queue 586 to bring the software under development up-to-date. The work queue 586 includes a file corresponding to the portion 200 of the source code program 100 of FIG. 2 identified by the waypoint 205. That is, the control block 472 initiates the processing of the tasks identified in the work queue 586 even before the user initiates a build. The control block 472 is able to process the files in this manner because the work queue 586 identifies the out-of-date nodes and the order in which these nodes should be processed. In the illustrated embodiment, the control block 472 is a thread executing in the background.

Figure 6:
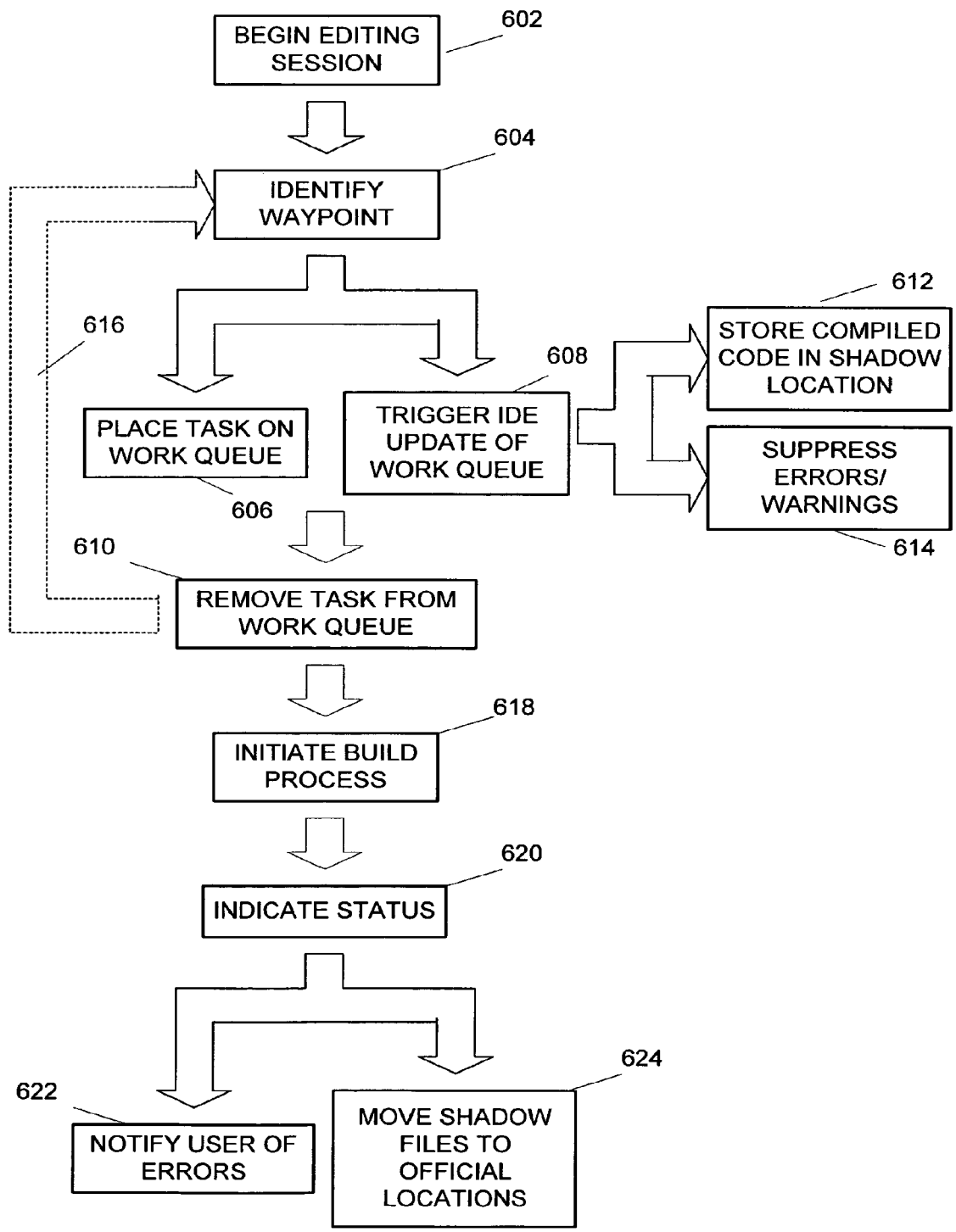
FIG. 6 is a flowchart of one particular implementation of the embodiment in FIG. 4 relative to the computing apparatus in FIG. 5.

Referring now to FIG. 6, a flow diagram of a method of the present invention is illustrated, in accordance with one embodiment thereof. A programmer begins a text editing session (at 602), in which they either edit an existing source code program 100 (shown in FIG. 2) or begin initial entry of an new source code program 100. As described above, the SCEM 573 then determines a waypoint (at 604) at an appropriate time. This identification places (at 606) a task, e.g., to compile or recompile the portion 200 of the source code file 102 in FIG. 2, on the work queue 586 and triggers (at 608) the IDE tool 575 to update the nodes on the work queue 586. In updating the work queue 586, the control block 472 may identify and execute tasks other than the recompile of the portion 200. In the illustrated embodiment, these other tasks may be associated with building a software application, and thus may involve acts such as moving files and directories, invoking compilers and linkers to respectively compile and link, and the like.

In the illustrated embodiment, once the portion 200 has been compiled, the task is removed from the work queue 586 (at 610) and the compiled code is stored (at 612) in a shadow location 584, shown in FIG. 5, different from the location where the files are typically stored when a build is initiated by the user. For example, object code files produced by compiling source code files may be stored in shadow folders. Storing files in a different location from the normal files allows the user to "roll back" to the results of the most recent user-initiated build process, in case situations where the user decides to undo any of the modifications that triggered the speculative processing. As described below, once the user initiates the build process, any files stored in the alternative location 584 may later be moved to the official location. Furthermore, in the illustrated embodiment, as the identified tasks are processed before the user initiates a build, any error(s) or warning(s) that are detected are suppressed (at 614) so as not to disturb the user until a time the user explicitly initiates the build process.

As was discussed above, some embodiments may employ multiple waypoints, e.g., the second waypoint 210 in FIG. 2. In these embodiments, the process of identifying a waypoint (at 604), placing the task on the work queue 586 (at 606), triggering the IDE 575 to update (at 608), and removing the task from the work queue 586 (at 610), may be iterated, as indicated by the ghosted lines 616. Note that, also as was discussed above, other conditions might trigger (at 608) the IDE to update tasks placed on the work queue 586 (at 606) and then remove them from the work queue 586 (at 610).

At the time of the user's choosing, the user may initiate (at 618) the build process, for example, when the editing is finished. The user initiates the build through the command line or through the graphical user interface. Ordinarily, upon detecting the user's request to initiate the build, the IDE tool 575 typically executes the tasks identified in the work queue 586. However, in accordance with the present invention, because the control block 472 may have pre-processed one or more of the tasks associated with the build process, the control block 472, upon detecting the user request to initiate the build (at 618), indicates (at 620) a status of the processing of the one or more tasks once the build process successfully completes or stops because of errors or warnings. The particular type of status indication provided (at 620) to the user depends on the results of the speculative processing.

If the speculative processing was unsuccessful because of error(s)/warning(s) that were detected (and suppressed) (at 614) during the process, the user may be notified (at 622) of the detected error(s)/warning(s) in response to detecting the request from the user to initiate the build. Thus, if errors are encountered during the speculative processing (such as during the compiling phase, for example), the user, once he initiates the build process, is notified that the compilation could not be completed because of the errors that were found. The user may then decide whether to keep the results of the compilation or scrap them. Since the results are stored in the shadow location 584, this is easily done.

If, on the other hand, the speculative processing completes successfully, then the files stored in the alternative (shadow) location 584 are moved (at 624) to the official locations and the user is thereafter notified that the build completed successfully. It should be noted that the act of moving the files from the alternative location to the official location may itself be an indication of the status (at 620) of the processing of the tasks. In one embodiment, a message may also be provided to the user indicating that the processing of the tasks was successful.

As will be appreciated by those skilled in the art, most aspects of the present invention will typically be implemented as software on an appropriately programmed computing device, e.g., the computing apparatus 300 in FIG. 3. The instructions may be encoded on, for example, the storage 310, the floppy disk 317, and/or the optical disk 320. Typically, though, to the instruction will be encoded on a local hard disk (not shown) for the computer apparatus that comprises a part of the storage 310. The present invention therefore includes, in one aspect, a computing apparatus programmed to perform the method of the invention. In another aspect, the invention includes a program storage device encoded with instructions that, when executed by a computing apparatus, perform the method of the invention.

Some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A computer-implemented method for use in developing a program, comprising:
    identifying a first and a second waypoint in at least a portion of a source code program;
    compiling, with a compiler configured for transforming computer code from a first form to a second form, the at least a portion of the source code program defined by the first and second waypoints during the editing of the source code program; and
    compiling, with the compiler, the source code from the first waypoint to the second waypoint before completing editing of the source code.

2. The computer-implemented method of claim 1, further comprising:
  completing editing of the source code; and
  compiling the source code from the second waypoint to the end of the source code.

3. The computer-implemented method of claim 1, further comprising at least one of:
  wherein identifying the first waypoint includes one of identifying the first waypoint from a static definition and identifying the first waypoint from a dynamic definition, and wherein identifying the second waypoint includes one of identifying the second waypoint from a static definition and identifying the second waypoint from a dynamic definition; and
  saving the edited source code.

4. An apparatus for developing a program, comprising a processor capable of:
  identifying a first waypoint and a second waypoint in an edited source code program during editing of the source code program; and
  compiling the source code program defined by the first identified waypoint and the second identified waypoint during at least a portion of a time period in which the source code program is being edited; and
  compiling the source code program from the first waypoint to the second waypoint before completing editing of the source code program.

5. The apparatus of claim 4, wherein the processor capable of identifying the first waypoint and the second waypoint further comprises the processor being capable of performing at least one of
  identifying the first waypoint and the second waypoint from a static definition;
  identifying the first waypoint and the second waypoint from a dynamic definition;
  identifying the first waypoint from a static definition and identifying the second waypoint from a dynamic definition; and
  identifying the second waypoint from a static definition and identifying the first waypoint from a dynamic definition.

6. The apparatus of claim 4, wherein the processor is further capable of at least one of:
  determining that the first waypoint defines an upper bound of the portion of the source code program; and
  determining that the second waypoint defines a lower bound of the portion of the source code program.

7. The apparatus of claim 4, wherein the processor is further capable of at least one of:
  compiling the source code program from the second waypoint to the end of the source code program upon completing editing of the source code program; and
  saving the edited source code.

8. A computer-implemented method for resuming compiler execution of a suspended compilation, comprising:
  triggering the compilation of a portion of a source code program whose upper bound is defined by an identified waypoint;
  compiling, with a compiler configured for transforming computer code from a first form to a second form, the portion of the source code program whose upper bound is defined by the identified waypoint; and
  compiling, with the compiler, the remaining source code upon completing compiling of the portion of the source code program whose upper bound is defined by the identified waypoint.

9. The computer-implemented method of claim 8, wherein triggering the compilation of the portion of the source code includes identifying the waypoint.

10. A computer-implemented method for identifying a command and associating it with a file that is being edited, comprising:
  modifying a file reader of a compiler to read from a standard input;
  triggering the compilation of a portion of a source code program whose upper bound is defined by an identified waypoint;
  invoking the compiler to read the file from the modified file reader through the standard input; and
  compiling, with a compiler configured for transforming computer code from a first form to a second form, the remaining source code upon completing compiling of the portion of the source code program whose upper bound is defined by the identified waypoint.

11. The computer-implemented method of claim 10, wherein modifying the file reader to read from the standard input includes modifying the identified file reader to read from an open system call.

12. The computer-implemented method of claim 10, wherein modifying the file reader to read from the open system call includes modifying the identified file reader to read from a UNIX gcc command.

13. The computer-implemented method of claim 10, wherein triggering the compilation of the portion of the source code includes identifying the waypoint.

14. A computer readable storage device encoded with instructions that, when executed by a processor, performs the method of:
  identifying a first waypoint in an edited source code program during editing of the source code program;
  compiling the source code program up to the identified first waypoint during at least a portion of a time period in which the source code program is being edited;
  compiling the source code from the first waypoint to the end of the source code upon completing editing of the source code; and
  identifying at least a second waypoint in the source code during editing of the source code; and
  compiling the source code from the first waypoint to the at least a second waypoint before completing editing of the source code.

15. A computer readable storage device encoded with instructions that,
  when executed by a processor, performs the method of:
  identifying a waypoint in an edited source code program during editing of the source code program;
  compiling the source code program up to a first identified waypoint during at least a portion of a time period in which the source code program is being edited;
  completing editing of the source code; and
  compiling the source code from a second waypoint to the end of the source code.

* * * * *